United States Patent
Lee et al.

(10) Patent No.: US 9,051,885 B2
(45) Date of Patent: Jun. 9, 2015

(54) INSPECTION SYSTEM FOR CONTINUOUS VARIABLE VALVE LIFT DEVICE

(71) Applicants: Hyundai Motor Company, Seoul (KR); Kia Motors Corporation, Seoul (KR)

(72) Inventors: Jong Won Lee, Suwon-si (KR); Kyoung Pyo Ha, Suwon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/010,239

(22) Filed: Aug. 26, 2013

(65) Prior Publication Data

US 2014/0182530 A1 Jul. 3, 2014

(30) Foreign Application Priority Data

Dec. 28, 2012 (KR) .................. 10-2012-0157506

(51) Int. Cl.
*F01L 1/34* (2006.01)
*F02D 13/02* (2006.01)

(52) U.S. Cl.
CPC .............. *F02D 13/02* (2013.01); *F01L 2810/00* (2013.01)

(58) Field of Classification Search
CPC ............................ F02D 13/02; F01L 2810/00
USPC .................. 123/90.15, 90.16, 90.39
See application file for complete search history.

(56) References Cited

U.S. PATENT DOCUMENTS

| 7,546,827 | B1 * | 6/2009 | Wade et al. .................... 123/324 |
| 2004/0099230 | A1 * | 5/2004 | Batchelor et al. .......... 123/90.16 |
| 2008/0141960 | A1 * | 6/2008 | Rohe et al. ................. 123/90.16 |

* cited by examiner

*Primary Examiner* — Zelalem Eshete
(74) *Attorney, Agent, or Firm* — Morgan, Lewis & Bockius LLP

(57) ABSTRACT

An inspection system for a continuous variable valve lift device includes: a drive motor configured to rotate a cam; a sensor unit including at least one sensor configured to output an electrical signal corresponding to rotational displacements at both ends of a swing arm which opens and closes a valve by receiving rotational motion of the cam through the continuous variable valve lift device; and an inspector configured to measure and inspect a valve lift of the continuous variable valve lift device by receiving and calculating the electrical signal of the sensor unit, and is installed in a vehicle engine assembly line to accurately measure and inspect the valve lift after the continuous variable valve lift device is assembled.

7 Claims, 8 Drawing Sheets

INSPECTION SYSTEM FOR CONTINUOUS VARIABLE VALVE LIFT DEVICE

CROSS-REFERENCE TO RELATED APPLICATION

The present application claims priority of Korean Patent Application Number 10-2012-0157506 filed Dec. 28, 2012, the entire contents of which application is incorporated herein for all purposes by this reference.

BACKGROUND OF INVENTION

1. Field of Invention

The present invention relates to an inspection system for a variable valve lift device, and more particularly, to an inspection system for a continuous variable valve lift device, which measures and inspects valve lift values of a continuous variable valve lift device assembled in a vehicle engine assembly line.

2. Description of Related Art

In general, in an engine of a vehicle, a combustion chamber configured to generate power by combusting fuel is provided, and a valve train is provided which includes an intake valve, which controls an inflow of air, or a mixture of air and fuel which flows into the combustion chamber, and an exhaust valve which controls an outflow of exhaust gas discharged from the combustion chamber.

In addition, the combustion chamber is opened and closed while the intake and exhaust valves of the valve train are operated by a cam which is moved together with rotational motion of a crankshaft rotated by receiving power generated by the combustion of fuel.

As the cam is formed to have a predetermined profile, the intake and exhaust valves always have a predetermined lift value, and amounts of inflow and outflow of air and exhaust gas, which flow into and out of the combustion chamber through the intake and exhaust valves, are also set to be a predetermined amount in accordance with the lift value of the cam.

By the way, when the lift values of the intake and exhaust valves are appropriately adjusted in accordance with an operational state of an engine for a vehicle, fuel efficiency and output of the engine may be increased, and therefore a variable valve lift device configured to adjust the lift value of intake and exhaust valves in accordance with an operational state of the engine is being proposed.

A continuous variable valve lift device among the variable valve lift devices adjusts the lift value of the valve for each driving region of the engine in a range from 1 mm to 11 mm, thereby achieving an improvement in fuel efficiency of the engine, and an increase in output of the engine.

FIG. 1 illustrates an example of a six joint link type continuous variable valve lift device according to the related art, and an end of a valve 10, which opens and closes a combustion chamber provided in an engine of a vehicle, is connected to a swing arm 12, the swing arm 12 is installed at an upper portion of a cylinder head, which forms a combustion chamber and is not illustrated, to be rotatable about a pivot shaft 14, and a hydraulic lash adjuster (HLA) is connected to the other end of the swing arm 12.

The six joint link type continuous variable valve lift (CVVL) device is installed on an upper portion of the swing arm 12, and continuously varies a valve lift value of the valve 10 which reciprocates by the swing arm 12.

The six joint link type continuous variable valve lift (CVVL) device includes a control shaft 20 disposed at a center, an eccentric cam 22 mounted on the control shaft 20 to be integrally rotated with the control shaft 20, and a control link 24 fitted with an outer circumference of the eccentric cam 22.

In addition, the six joint link type continuous variable valve lift (CVVL) device includes an input link 26 disposed in a clockwise direction based on the control link 24 and having one end connected to the control link 24, an input rocker 28 connected to the other end of the input link 24 and mounted to be fitted with an outer circumference of the control shaft 20, an output link 30 disposed in a counterclockwise direction based on the control link 24 and having one end connected to the control link 24, and an output rocker 32 having one end connected to the other end of the output link 30 and mounted to be fitted with an outer circumference of the control shaft 20.

A roller 12a of the swing arm 12 is installed to be in contact with a lower end operating surface of the output rocker 32, and a roller 28a of the input rocker 28 is installed to be in close contact with a cam 40 which is rotated through a camshaft 40a.

Accordingly, when the cam 40 is rotated by receiving rotational power of the engine, rotational motion of the cam 40 is inputted to the continuous variable valve lift (CVVL) device through the input rocker 28 and then transmitted to the swing arm 12 via the operating surface of the output rocker 32, and the swing arm 12 reciprocates the valve 10 while rotating.

When the valve lift is adjusted by the continuous variable valve lift (CVVL) device, the control shaft 20 is rotated in a clockwise direction by a control of a controller, which is not illustrated, the eccentric cam 22 is rotated by the rotational motion of the control shaft 20, and the output link 30 and the output rocker 32 are moved by the rotational motion of the eccentric cam 22, respectively, as indicated by the arrow.

When the output rocker 32 is moved toward the valve 10, a contact point between the lower end operating surface of the output rocker 32 and the roller 12a of the swing arm 12 is changed, thereby adjusting the valve lift value.

That is, the valve lift value of the valve may be continuously varied in accordance with a moving stroke of the output rocker 32.

The aforementioned continuous variable valve lift (CVVL) device is assembled in a vehicle engine assembly line. A cylinder block, a crankshaft, a piston, and a cylinder head are sequentially assembled in the engine assembly line, and the continuous variable valve lift device is assembled in a process of assembling the cylinder head.

As the continuous variable valve lift device includes a plurality of components, and the components are assembled, manufacturing tolerance of each of the components and assembly tolerance inevitably occur. The continuous variable valve lift device typically varies the valve lift value in a range from 1 mm to 11 mm. In a case in which the valve lift value is 1 mm, even when manufacturing tolerance or assembly tolerance is just about 10% (0.1 mm) thereof, an intake deviation amount of intake gas for each cylinder occurs to be 10% or more, and as a result, stalling of an engine may occur, or fuel efficiency may deteriorate, and exhaust gas may be degraded.

Therefore, manufacturing tolerance of each constituent component is preferentially measured and checked before the continuous variable valve lift device is assembled, and if the manufacturing tolerance occurs, a cap shim is mounted on a valve stem of the valve assembled to the swing arm so as to absorb the manufacturing tolerance.

However, if assembly tolerance inevitably occurs even after the continuous variable valve lift device is assembled, and the assembly tolerance is not appropriately solved, the aforementioned degradation in engine performance occurs, and therefore it is necessary to necessarily perform an inspection in the vehicle engine assembly line after the continuous variable valve lift device is assembled.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an inspection system for a continuous variable valve lift device, having advantages of preventing an error in assembly of the continuous variable valve lift device and achieving improvement in engine performance by allowing assembly tolerance to be inspected after the continuous variable valve lift device is assembled during a vehicle engine assembly line.

Various aspects of the present invention provide for an inspection system for a continuous variable valve lift device, including: a drive motor configured to rotate a cam; a sensor unit including at least one sensor configured to output an electrical signal corresponding to rotational displacements at both ends of a swing arm which opens and closes a valve by receiving rotational motion of the cam through the continuous variable valve lift device; and an inspector configured to measure and inspect a valve lift of the continuous variable valve lift device by receiving and calculating the electrical signal of the sensor unit.

The sensor unit may include a linear variable differential transformer.

The sensor of the sensor unit may be installed in plural numbers for each cylinder of an engine.

The valve may be coupled to one end of the swing arm, and a hydraulic lash adjuster may be coupled to the other end of the swing arm.

In a case in which the continuous variable valve lift device is a six joint link type, and lengths at both ends of the swing arm are different from each other, the inspector may calculate the valve lift by multiplying a rotational displacement amount at one end of the swing arm by a constant value, and adding a rotational displacement amount at the other end of the swing arm thereto.

In a case in which a length ratio at both ends of the swing arm is 20:33.3, and a cap shim having a thickness of 20 μm is installed on the valve, when the valve lift is decreased to be −9.6 μm as a pivot shaft of the swing arm is moved, the constant value may be 29.6/33.3.

The continuous variable valve lift device may include: a control shaft disposed at a center; an eccentric cam integrally mounted and/or monolithically formed on the control shaft to be integrally rotated with the control shaft; a control link fitted with an outer circumference of the eccentric cam; an input link disposed in a clockwise direction based on the control link and having one end connected to the control link; an input rocker connected to the other end of the input link and mounted to be fitted with an outer circumference of the control shaft; an output link disposed in a counterclockwise direction based on the control link and having one end connected to the control link; and an output rocker having one end connected to the other end of the output link and fitted with the outer circumference of the control shaft so as to come into close contact with the swing arm.

The inspection system may further include a lift device configured to lift up and down an engine assembled by including the cam; and a jig configured to fix and lift up and down the sensor unit.

According to the inspection system for a continuous variable valve lift device according to various aspects of the present invention, the cam is rotated by operating the camshaft drive motor after each of components of the continuous variable valve lift device is assembled, and the valve lift is measured by detecting, by using the sensor, rotational displacements at both front end portions of the swing arm which is rotated about a central axis in accordance with the rotation of the cam, and as a result, the valve lift may be accurately and easily inspected after the continuous variable valve lift device is assembled.

In addition, the inspection system according to various aspects of the present invention may be introduced into the vehicle engine assembly line as one inspection process. Therefore, productivity may be improved, and deterioration in engine performance may be prevented by preventing an error in assembly of the continuous variable valve lift device.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
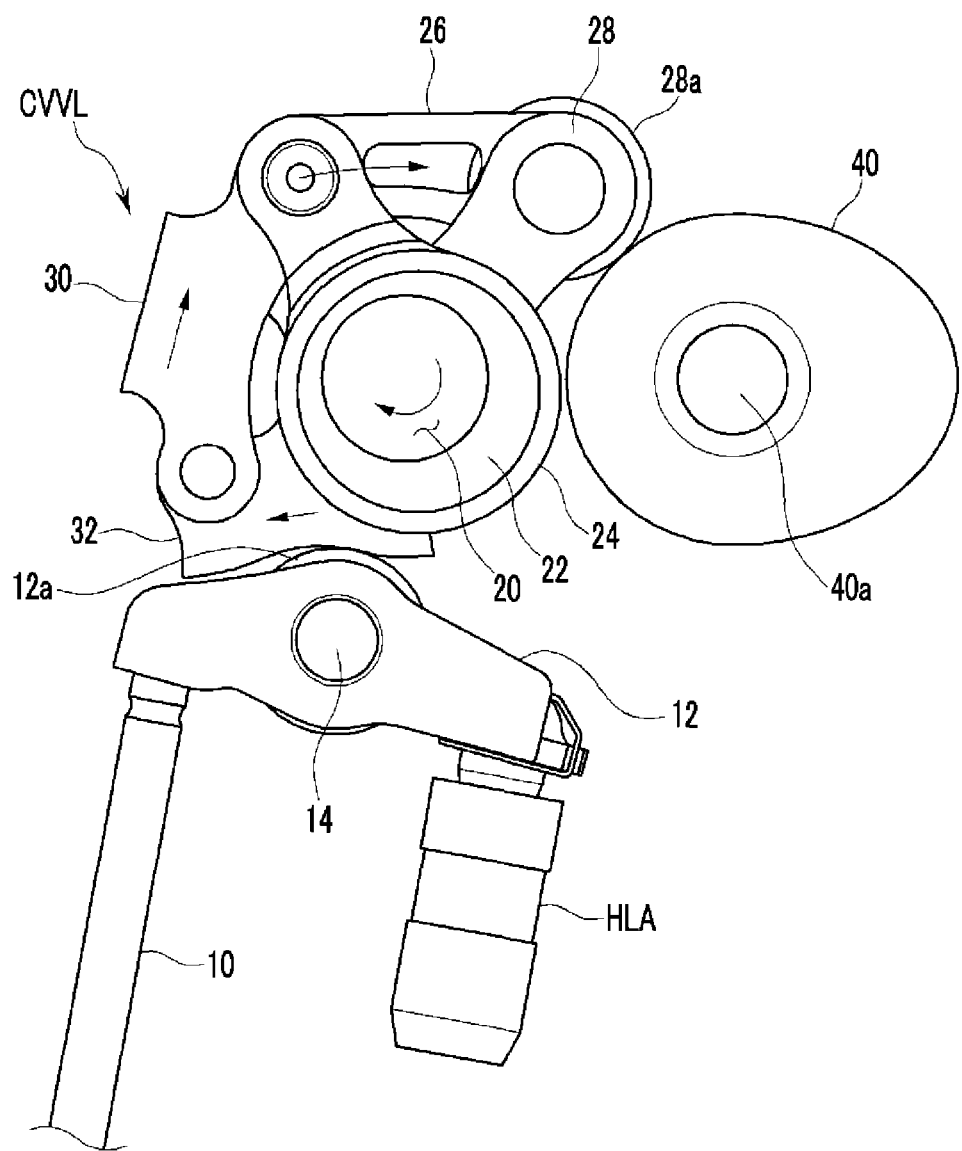
FIG. 1 is a front view illustrating an example of a continuous variable valve lift device according to the related art.

The six joint link type continuous variable valve lift (CVVL) device, which has been described with reference to FIG. 1, is subject to an inspection in an inspection system for a continuous variable valve lift device according to various embodiments of the present invention.

A valve stem 10a of a valve 10, which opens and closes a combustion chamber of an engine, is coupled to an end of a swing arm 12, a hydraulic lash adjuster (HLA) is coupled to the other end of the swing arm 12, and the six joint link type continuous variable valve lift (CVVL) device includes a shoe 32a of an output rocker 32 which comes into contact with a roller 12a of the swing arm 12.

In order to set a basic principle of the inspection system according to various embodiments of the present invention, the following experiment and measurement are performed.

Figure 2:
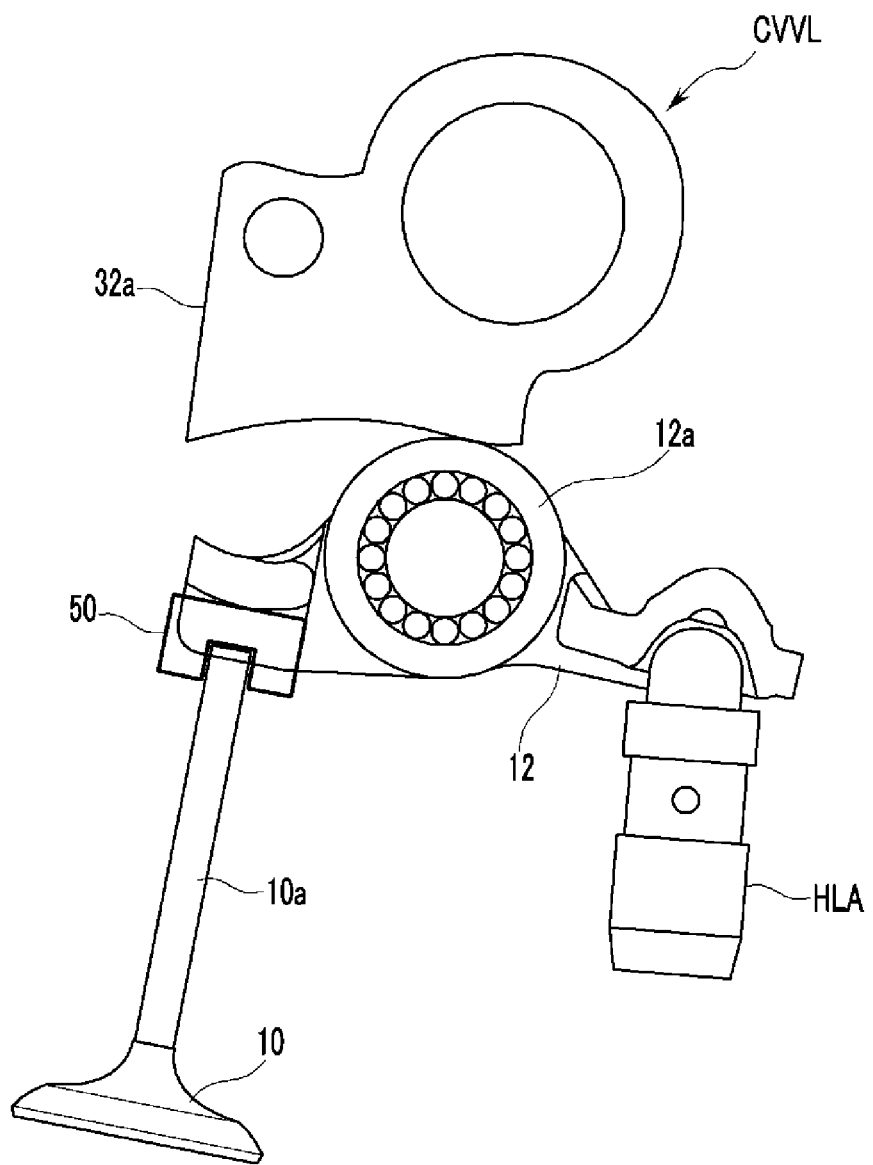
FIG. 2 is a schematic configuration view of an exemplary continuous variable valve lift device that is subject to an inspection in an inspection system according the present invention.
Figure 3:
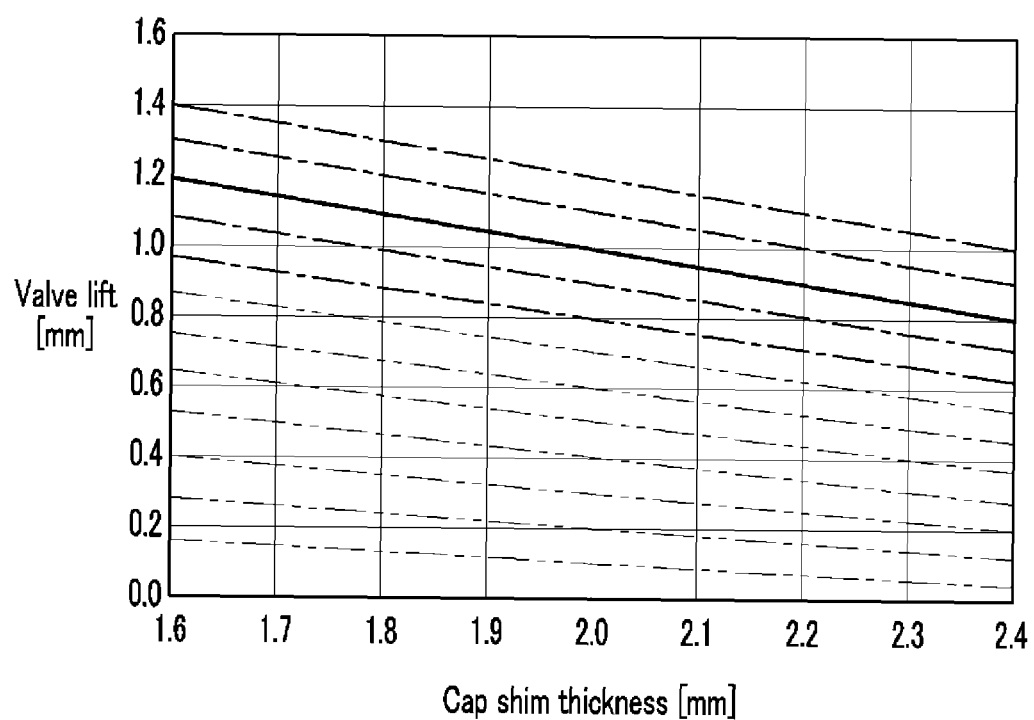
FIG. 3 is a graph illustrating a variation in valve lift with respect to an increase in thickness of a cap shim.

That is, when a cap shim 50 having a predetermined thickness is mounted on the valve stem 10a, as illustrated in FIG. 2, as a result of measuring a variation amount of the valve lift value, a graph illustrated in FIG. 3 was obtained.

When considering the graph, as a thickness of the cap shim 50 is increased, the valve lift value is nearly linearly decreased. For example, in a case in which the cap shim of 1.6 mm is mounted, and the valve lift value is 1.4 mm, when a thickness of the cap shim is increased to be 2.4 mm, the valve lift value is decreased from 1.4 mm to nearly 1.0 mm.

Figure 4:
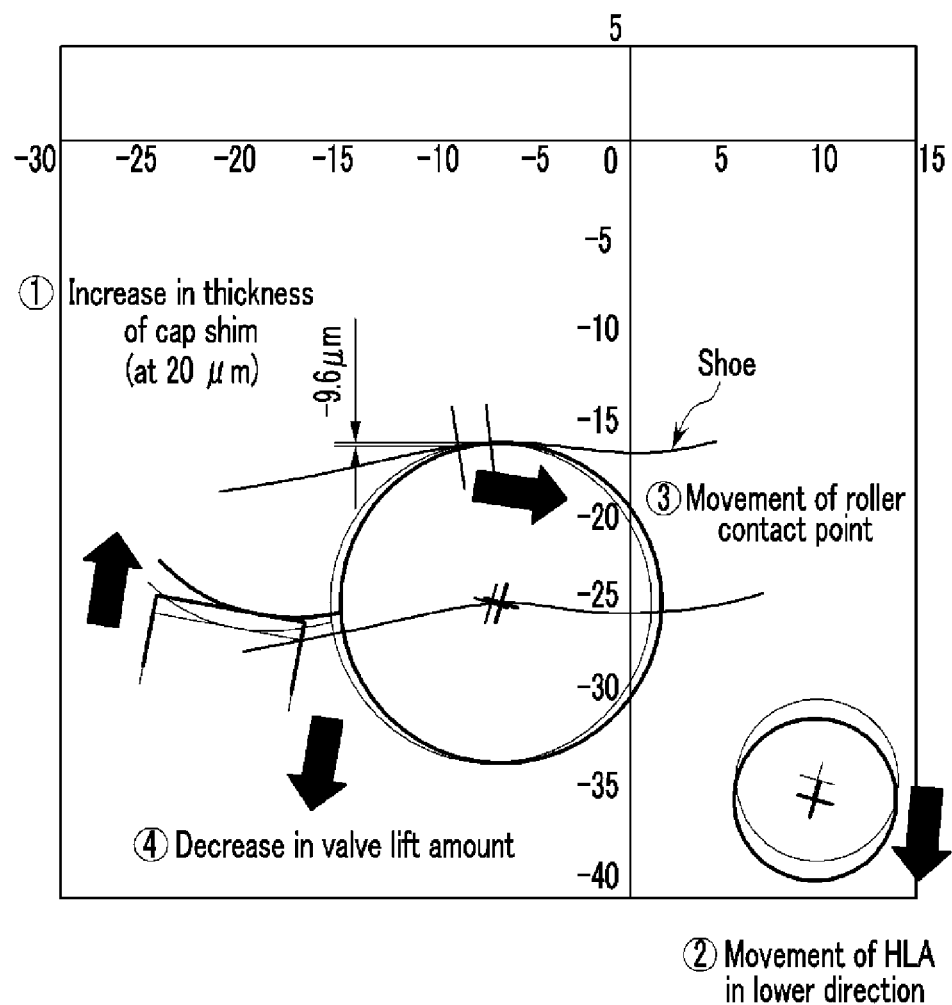
FIG. 4 is an explanation view for explaining a variation in valve lift and a variation of a swing arm with respect to an increase in thickness of the cap shim.

In this phenomenon as illustrated in FIG. 4, when the thickness of the cap shim is increased, a contact point between the shoe 32a of the output rocker and the roller 12a of the swing arm 12 is moved to the right, the hydraulic lash adjuster (HLA) is moved in a lower direction, and thereby the valve lift value is decreased.

Figure 5:
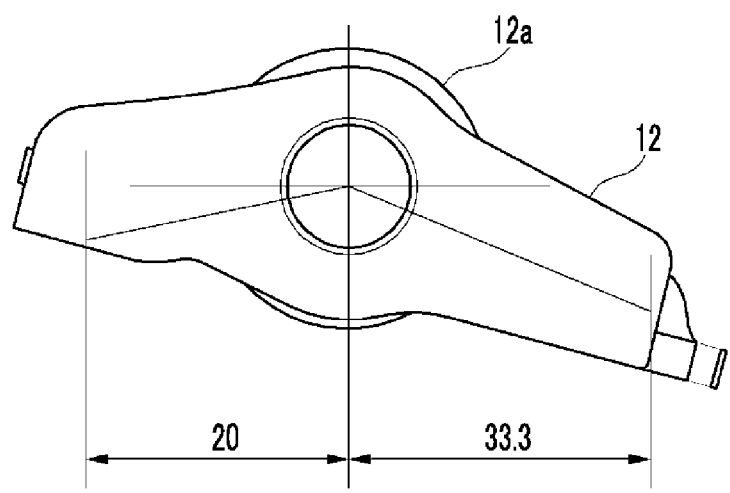
FIG. 5 is a front view of a swing arm of the continuous variable valve lift device that is subject to an inspection.

As illustrated in FIG. 5, in a case in which a length ratio of a length from an axial center of the swing arm 12 to one end to which the valve stem 10a is coupled to a length from the axial center of the swing arm 12 to the other end to which the hydraulic lash adjuster (HLA) is coupled is 20:33.3, when the thickness of the cap shim 50 is increased by 20 μm, the contact point where the roller 12a of the swing arm 12 comes into contact with the shoe 32a of the output rocker 32 is moved to the right, and as a result, the valve lift value varies by −9.6 μm.

By using the aforementioned phenomenon, the following formula for calculating the valve lift was determined.

$$Lv = L1 + 29.6/33.3 * L2 \qquad \text{Eq. (1)}$$

Lv refers to a valve lift value, L1 refers to a displacement amount of a valve side of the swing arm, and L2 refers to a displacement amount of an HLA side of the swing arm.

The constant value 29.6/33.3 refers to a constant value that is specified when the continuous variable valve lift device is a six joint link type, and the length ratio at both ends of the swing arm is 20:33.3, and when the structure of the continuous variable valve lift device is changed, or the length ratio at both ends of the swing arm is changed, the constant value is changed.

An experiment was performed to check for the formula for calculating the valve lift, which was obtained as described above.

Figure 6:
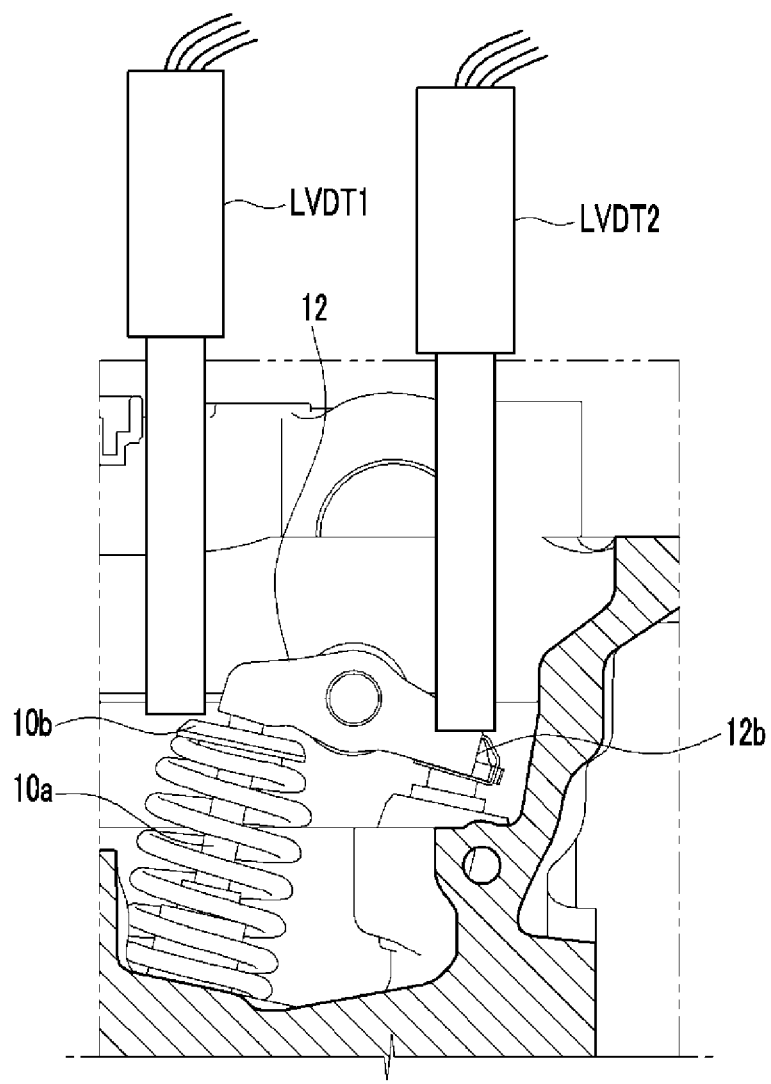
FIG. 6 is an installation configuration view of an exemplary sensor that measures rotational displacement at both ends of the swing arm according to the present invention.

That is, as illustrated in FIG. 6, sensors LVDT1 and LVDT2 are installed at a spring retainer 10b of the valve 10 and one end 12b of the swing arm 12 to which the hydraulic lash adjuster (HLA) is coupled, respectively, and then displacement amounts of the spring retainer 10b and one end 12b of the swing arm 12 were measured.

The reason why the sensor LVDT1 is installed at the spring retainer 10b is because an installation space is limited, and the results are identical when the sensor is installed at the other end of the swing arm.

The sensor is a publicly known linear variable differential transformer (LVDT) and is a displacement measurement instrument which converts mechanical displacement into an electrical signal.

Figure 7:
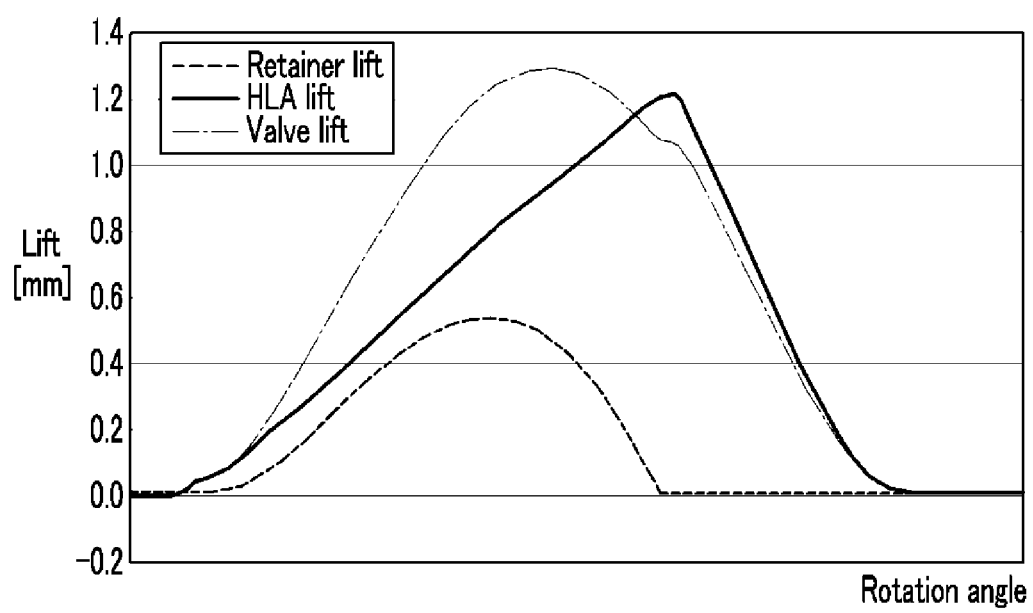
FIG. 7 is a graph for explaining a relationship between a valve lift, an HLA lift, and a retainer lift, which are measured by the sensor of FIG. 6.

A measurement result by using the sensors LVDT1 and LVDT2 is illustrated in FIG. 7, and it was confirmed that the valve lift Lv is a result of a sum of the displacement amount L1 of the valve side of the swing arm and the displacement amount L2 of the HLA side of the swing arm multiplied by the specific constant value 29.6/33.3.

Therefore, the inspection system according to various embodiments of the present invention uses the result of measuring displacement amounts at both ends of the swing arm, multiplying the measured displacement amount by the constant value, and adding the result together, as described above, and as a result, the valve lift may be accurately measured and inspected in a state in which the continuous variable valve lift device is assembled.

Figure 8:
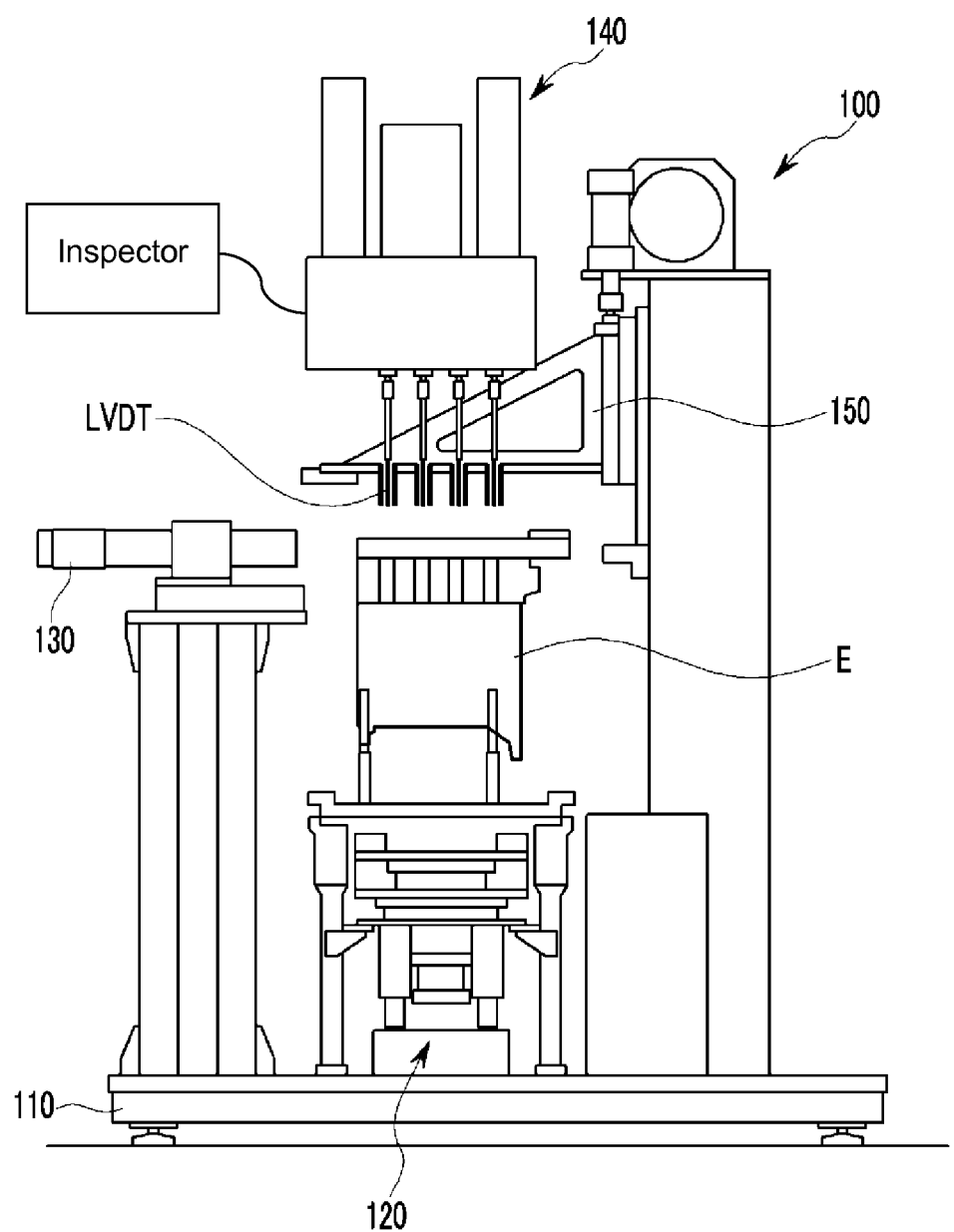
FIG. 8 is a schematic configuration view of an exemplary inspection system according to the present invention.

The inspection system using the sensors is schematically illustrated in FIG. 8, and installed in a vehicle engine assembly line to inspect the continuous variable valve lift device.

The inspection system 100 may include a base 110, a lift device 120 configured to lift up and down an engine E that is assembled, and a drive motor 130 configured to rotate a camshaft E1 of the engine E.

In addition, the inspection system 100 may include a sensor unit 140 including linear variable differential transformers as a plurality of sensors LVDTs which measures displacement amounts at both ends of the swing arm of the continuous variable valve lift (CVVL) device, and a jig 150 configured to fix and lift up and down the sensor unit 140.

As the sensors, sixteen sensors may be used in a case of a four-cylinder engine by installing four sensors per each cylinder of the engine, but the present invention is not limited thereto, and a plurality of sensors may be installed for each cylinder.

In addition, the sensor LVDT converts a displacement of the swing arm into an electrical signal and inputs the electrical signal to an inspector, the inspector calculates the valve lift in accordance with the formula for calculating the valve lift by using the input electrical signal, and thereby the valve lift of the continuous variable valve lift device, which is assembled, may be accurately measured and inspected.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inspection system for a continuous variable valve lift device, comprising:
    a drive motor configured to rotate a cam;
    a sensor unit including at least one sensor configured to output an electrical signal corresponding to rotational displacements at opposing ends of a swing arm that opens and closes a valve which is engaged to one end of the swing arm, by receiving rotational motion of the cam through the continuous variable valve lift device; and an inspector configured to measure and inspect a valve lift of the continuous variable valve lift device by receiving and calculating the electrical signal of the sensor unit, wherein when the continuous variable valve lift device is a six joint link type, and lengths at the opposing ends of the swing arm are different from each other, the inspector calculates the valve lift by multiplying a rotational displacement amount at one of the opposing ends of the swing arm by a constant value, and adding a rotational displacement amount at the other of the opposing ends of the swing arm thereto.

2. The inspection system of claim 1, wherein:
the sensor unit includes a linear variable differential transformer.

3. The inspection system of claim 2, wherein:
the sensor of the sensor unit includes a plurality of sensors, each corresponding to each cylinder of an engine.

4. The inspection system of claim 1, wherein:
the valve is coupled to the one of the opposing ends of the swing arm, and
a hydraulic lash adjuster is coupled to the other of the opposing ends of the swing arm.

5. The inspection system of claim 1, wherein:
in a case in which a length ratio at the opposing ends of the swing arm is 20:33.3, and a cap shim having a thickness of 20 μm is installed on the valve, when the valve lift is decreased to be −9.6 μm as a pivot shaft of the swing arm is moved, the constant value is 29.6/33.3.

6. The inspection system of claim 4, wherein:
the continuous variable valve lift device includes:
a control shaft disposed at a center;
an eccentric cam mounted on the control shaft to be integrally rotated with the control shaft;
a control link fitted with an outer circumference of the eccentric cam;
an input link disposed in a clockwise direction based on the control link and having one of the opposing ends connected to the control link;
an input rocker connected to the other of the opposing ends of the input link and mounted to be fitted with an outer circumference of the control shaft;
an output link disposed in a counterclockwise direction based on the control link and having one end connected to the control link; and
an output rocker having one end connected to an opposing end of the output link and fitted with the outer circumference of the control shaft so as to come into close contact with the swing arm.

7. The inspection system of claim 1, further comprising:
a lift device configured to lift up and down an engine assembled by including the cam; and
a jig configured to fix and lift up and down the sensor unit.

* * * * *